Figure 1:
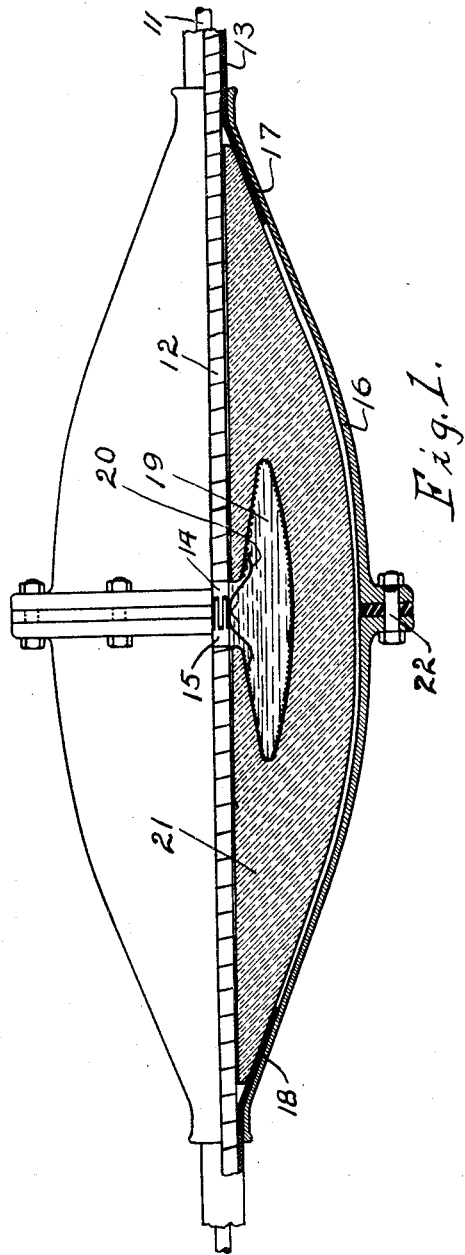

Aug. 26, 1930.　　　A. O. AUSTIN　　　1,773,716
JOINT FOR CONDUCTOR CABLES
Original Filed Aug. 5, 1926　　2 Sheets-Sheet 1

INVENTOR.
Arthur O. Austin
BY Nissen & Crane
ATTORNEYS.

Patented Aug. 26, 1930

1,773,716

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

JOINT FOR CONDUCTOR CABLES

Application filed August 5, 1926, Serial No. 127,439. Renewed October 8, 1929.

This invention relates to a connection for insulated cables for high voltages and has for one of its objects the provision of joints for high tension cables which can be readily made up and which will not constitute a weak connection in the conductor.

Further objects will appear hereinafter.

The invention is exemplified in the combination and arrangement of parts shown in the accompanying drawings and described in the following specification, and it is more particularly pointed out in the appended claims.

In the drawings—

Figure 2:
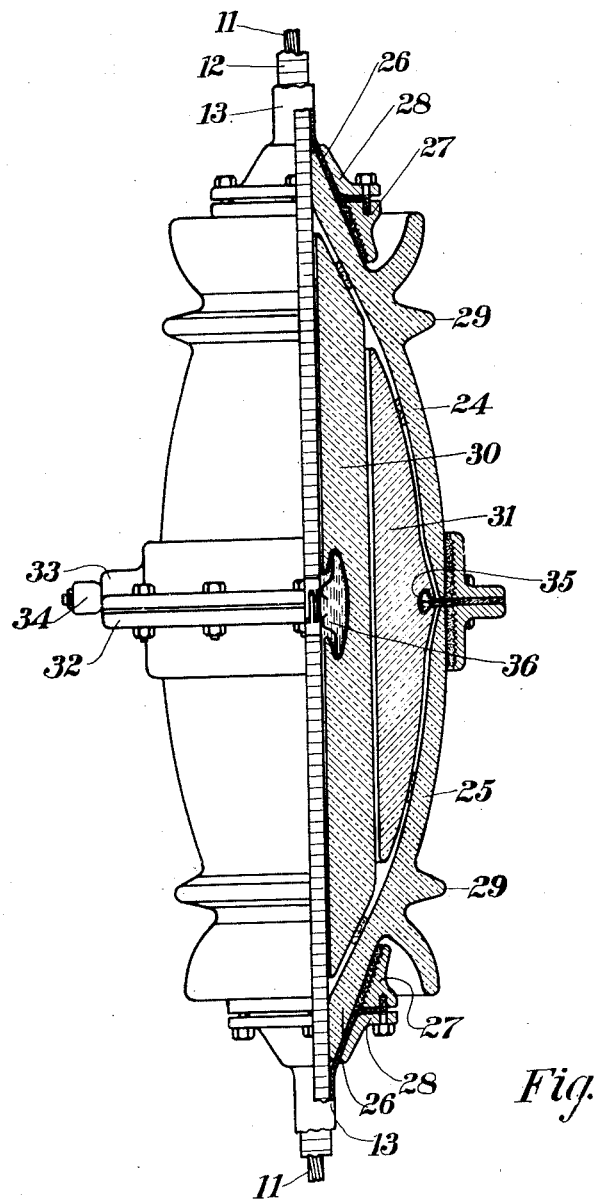

Fig. 1 is part elevation and part section showing one embodiment of the present invention; and Fig. 2 is a view similar to Fig. 1 showing a modification.

In the form of the invention shown in Fig. 1, the conductor 11 is covered with a layer of insulation 12 which in turn is covered by a lead sheath 13. The lead sheath is stripped the required amount on the two ends which are to be joined and complementary connectors 14 and 15 attached by sweating, clamping or by other means to the respective ends 11. The clamping bells 16 are then slipped back over the lead sheath which is then flared as at 17 and 18. Where the voltages are high there is danger of charging current flowing over the surface of the insulation from the complementary fittings 14 and 15 terminating the ends of the conductor 11. This may be avoided by the use of insulated control pockets 19. These pockets are filled with conducting material or have metallized surfaces which are placed in electrical contact with the conductor and complementary fittings through springs 20 or by other suitable means. Pocket 19 may be filled with a conducting cement or with a fusible metal. In general, however, it is more satisfactory to simply metallize the surface with the silvering process used in coating mirrors or by a combination of silvering and electroplating.

In order that the charging current will not flow along the insulation where the flared lead sheath 17 and 18 leaves the conductor, the sheath is brought away from the insulation gradually and an insulating member 21 with tapered ends is inserted so as to fill the space. Where the member is made of dielectric material such as porcelain which has a specific inductive capacity considerably greater than that over the insulation of the conductor, the taper may be more abrupt as the dielectric flux will flow through the member more readily and tend to eliminate the possibility of charging current flowing along the surface of the cable insulation from the lead sheath. The outer surface of the dielectric member 21 may be entirely metallized or where the metallic parts are close to the surface, this metallization is not necessary.

After the two ends of the cable with complementary members 14 and 15 are slipped into the dielectric members, the conical members 16 are then drawn into position by the bolts 22. This causes the tapered lead sheath to be clamped between the dielectric member 21 and the cover 16 making a tight joint.

With this class of construction the shield members may be made out of thin material in which case they will adjust themselves to any irregularities in the dielectric member or the flared lead sheath. If desired, the dielectric member 21 may be reinforced by placing other dielectric members on the outside to absorb a portion of the stress in a radial direction or the shield member 16 may be enlarged and the intervening space filled with oil, wax, or other dielectric medium. In this case it is necessary to use a gasket between the members 16 which will yield sufficiently to permit the lead sheath at 17 and 18 to be tightened.

In the joint shown in Fig. 1, the dielectric member 21 with tapered ends will gradually take up the dielectric stress between the sheath and the conductor and at the same time forms a barrier between the connector and ground or shield.

A form of the invention suitable for extremely high voltages is shown in Fig. 2. In this form the insulating member is made up in several parts to facilitate manufacture. The dielectric members 24 and 25 have tapered ends 26 similar to those in Fig. 1. A collar or flange 27 is cemented to each of the members 24 and 25. The lead sheaths are flared as in Fig. 1 and clamped between the flanges 28 and the dielectric members 24 and 25 or between the members 28 and 27. The shells 24 and 25 may be entirely covered with a metal shield or have their outer surfaces metallized if desired or they may be shown with an insulating surface as in Fig. 2. Where there is an insulating surface as shown in Fig. 2, the joint may be used to break up currents in the sheath and also to reduce the electrostatic stress on the dielectric members at the center of the joint. Where the outer surface of the dielectric members is used as an insulator, this surface may be provided with petticoats 29 or any suitable form to increase the insulation.

A series of insulating baffles 30 and 31 are placed inside of the outer housings. The two outer shells 24 and 25 may be clamped together by the flanges 32 and 33 which are preferably cemented to them. A gasket may be used between the flanges 32 and 33 or between the ends of the dielectric members 24 and 25. A filling tube 34 is inserted in the joint. This filling tube may be used to make electrical connection to the insulated control pocket 35 which tends to prevent discharge from the flange along the joint, between members 31 and 24 and 25. An insulated control pocket 36 may be provided opposite the detachable connectors which corresponds to the insulated control pocket 19 in Fig. 1. This form of joint has the advantage that it is cheaply made, may be used to break up longitudinal currents in the conductor sheath, may be made for very high voltages and is readily installed. The joint is such that the cable may be readily disconnected in case of a faulty section. With the tapered or conical outer members a variety of baffles may be used in place of the members 30 and 31. The expansion chamber may be attached to the filling outlet 34.

I claim:—

1. The combination with a pair of cables each comprising a conductor, an insulating covering for said conductor and an outer metal sheath, of means forming a joint between the ends of said conductors, the ends of said metal sheaths being spaced from said joint, a sleeve of solid dielectric material surrounding said joint and the insulating covering adjacent thereto, said sleeve having tapered portions at the opposite ends thereof extending between the ends of said sheaths and said insulating covering, and means clamping the ends of said sheaths against said tapered portions.

2. The combination with a pair of cables each having a conductor, an insulating covering surrounding said conductor and an outer metal sheath, of means connecting the ends of said conductors, the ends of said sheaths being spaced from the ends of said conductors, a sleeve of solid dielectric material surrounding said conductors and insulating covering between the ends of said sheaths, the opposite ends of said sleeve being tapered and disposed between the ends of said sheaths and said insulating covering, casing members having tapered portions, and means for drawing said casing members together to clamp the tapered portions thereof against the ends of said sheaths to hold said sheaths in contact with the tapered ends of said sleeve.

3. The combination with a pair of cables each having a conductor, an insulating covering and an outer metal sheath, of means joining the ends of said conductors, the ends of said sheaths being spaced from the ends of said conductors, a sleeve of solid dielectric material surrounding the connection between said conductors and the insulating covering adjacent thereto, said sleeve having a pocket therein adjacent the joint between said conductors, conducting material within said pocket forming a flux control member, the opposite ends of said sleeve being tapered, and means for clamping the ends of said sheaths to the tapered ends of said sleeve.

4. The combination with a pair of cables each having a conductor, an insulating covering for said conductor and an outer metal sheath, of means joining the ends of said conductors to form electrical connection therebetween, the ends of said metal sheaths being spaced from the ends of said conductors, a dielectric sleeve surrounding the joint between said conductors and the insulating covering adjacent thereto, and means connecting the ends of said sheaths to said insulating sleeve, said sleeve forming an insulating break between said sheaths.

5. The combination with a pair of cables each having a conductor, an insulating covering surrounding said conductor and an outer metal sheath, of means joining the ends of said conductors, the ends of said sheaths being spaced from the ends of said conductors, a dielectric sleeve surrounding the joint between said conductors and the insulating covering adjacent thereto, and clamping members secured to the ends of said sleeve and securing the ends of said sheaths thereto, said clamping members being insulated from each other by said sleeve.

6. The combination with a pair of cables each having a conductor, a dielectric covering and an outer metal sheath, of means joining adjacent ends of said conductors, said sheaths being spaced from the ends of said conductors to expose portions of said insulating covering, a pair of bell-shaped housing members of dielectric material having their smaller ends connected with said sheaths respectively and having their larger ends secured to each other forming a housing surrounding the joint between said conductors and the adjacent exposed insulating covering, and a tubular baffle member disposed within said housing and closing the joint between said conductors and the adjacent insulating covering.

7. The combination with a pair of cables each having a conductor, an insulating covering and an outer metal sheath, of means joining adjacent ends of said conductors, the ends of said sheaths being spaced from the ends of said conductors, a pair of bell-shaped dielectric housing members having their smaller ends secured to the ends of said sheaths respectively and having their larger ends disposed adjacent each other and secured together, and a pair of concentric tubular baffles surrounding the portion of said cables within said housing members, a flux control member in the interior one of said baffles adjacent the joint between said conductors, and a second flux control member within the outer one of said baffles and adjacent the joint between said housing members.

8. The combination with a pair of cables each having a conductor, an insulating covering and an outer metal sheath, of means connecting the adjacent ends of said conductors, the ends of said sheaths being spaced from the ends of said conductors to expose the insulating covering adjacent the ends of said conductors, a pair of concentric tubular baffle sleeves disposed one within the other and surrounding the joint between said conductors, a pair of housing members of dielectric material having tapered ends secured to the ends of said sheaths respectively, clamping members secured to adjacent ends of said housing members, means securing said clamping members together to form a casing about said baffle sleeves, and means for filling said casing with an insulating compound.

In testimony whereof I have signed my name to this specification on this 30th day of July A. D. 1926.

ARTHUR O. AUSTIN.